(12) United States Patent
Ohno

(10) Patent No.: US 10,750,053 B2
(45) Date of Patent: Aug. 18, 2020

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Akira Ohno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 15/923,091

(22) Filed: Mar. 16, 2018

(65) Prior Publication Data

US 2018/0278801 A1 Sep. 27, 2018

(30) Foreign Application Priority Data

Mar. 21, 2017 (JP) ................................. 2017-054873
Dec. 13, 2017 (JP) ................................. 2017-238918

(51) Int. Cl.
| G06K 9/00 | (2006.01) |
| H04N 1/44 | (2006.01) |
| G06Q 10/06 | (2012.01) |
| G06Q 50/00 | (2012.01) |
| G06Q 10/10 | (2012.01) |
| H04N 7/18 | (2006.01) |

(52) U.S. Cl.
CPC ......... *H04N 1/448* (2013.01); *G06K 9/00362* (2013.01); *G06K 9/00771* (2013.01); *G06Q 10/06* (2013.01); *G06Q 10/105* (2013.01); *G06Q 50/00* (2013.01); *H04N 7/18* (2013.01)

(58) Field of Classification Search
None
See application file for complete search history.

(56) References Cited

U.S. PATENT DOCUMENTS 9,338,008 B1 * 5/2016 Kirkland ............... H04L 9/0825
9,582,709 B2    2/2017 Wang et al.
(Continued)

FOREIGN PATENT DOCUMENTS

| JP | 2006-054719 A | 2/2006 |
| JP | 2009-124618 A | 6/2009 |

(Continued)

OTHER PUBLICATIONS

The above patent documents were cited in a European Search Report dated Aug. 20, 2018, which is enclosed, that issued in the corresponding European Patent Application No. 18159428.4.

(Continued)

*Primary Examiner* — Wei Wen Yang
(74) *Attorney, Agent, or Firm* — Cowan, Liebowitz & Latman, P.C.

(57) ABSTRACT

An image processing apparatus, comprising: an obtainment unit configured to obtain an image captured by an image capturing apparatus; a recognition unit configured to recognize a person from the image obtained by the obtainment unit; a setting unit configured to set a time limit for the person to be recognized by the recognition unit; and a processing unit configured to execute processing for privacy protection on an image including the person for which the time limit set by the setting unit has been exceeded.

8 Claims, 24 Drawing Sheets

(56) References Cited

U.S. PATENT DOCUMENTS

| | | | | |
|---|---|---|---|---|
| 2007/0153091 A1* | 7/2007 | Watlington | ............. | H04N 7/15 348/208.14 |
| 2011/0176025 A1* | 7/2011 | Anabuki | ............ | G06K 9/00335 348/222.1 |
| 2014/0023248 A1 | 1/2014 | Yoo et al. | | |

FOREIGN PATENT DOCUMENTS

| | | | |
|---|---|---|---|
| JP | 2011-091705 A | 5/2011 | |
| JP | 2016-009453 A | 1/2016 | |
| JP | 2016-158156 A | 9/2016 | |
| WO | 2012/001947 A1 | 1/2012 | |

OTHER PUBLICATIONS

Dalal, et al "Histograms of Oriented Gradients for Human Detection" Computer Vision and Pattern Recognition, 2005. CVPR 2005. IEEE Computer Society Conference Cited in Specification in paragraph [0030].

The above foreign documents were cited in a Jan. 8, 2019 Japanese Office Action, which is enclosed without an English Translation, Japanese Patent Application No. 2017-238918.

\* cited by examiner

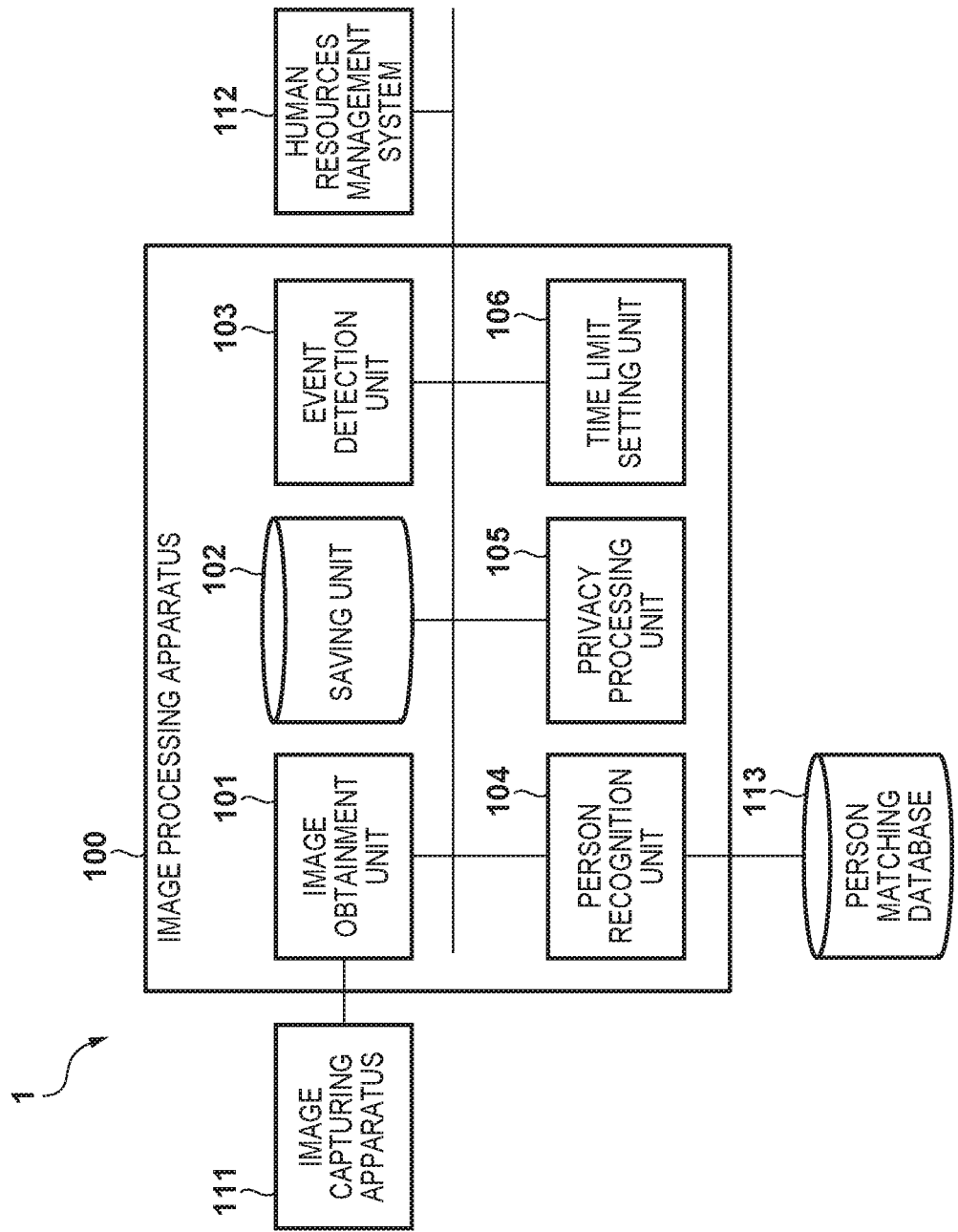

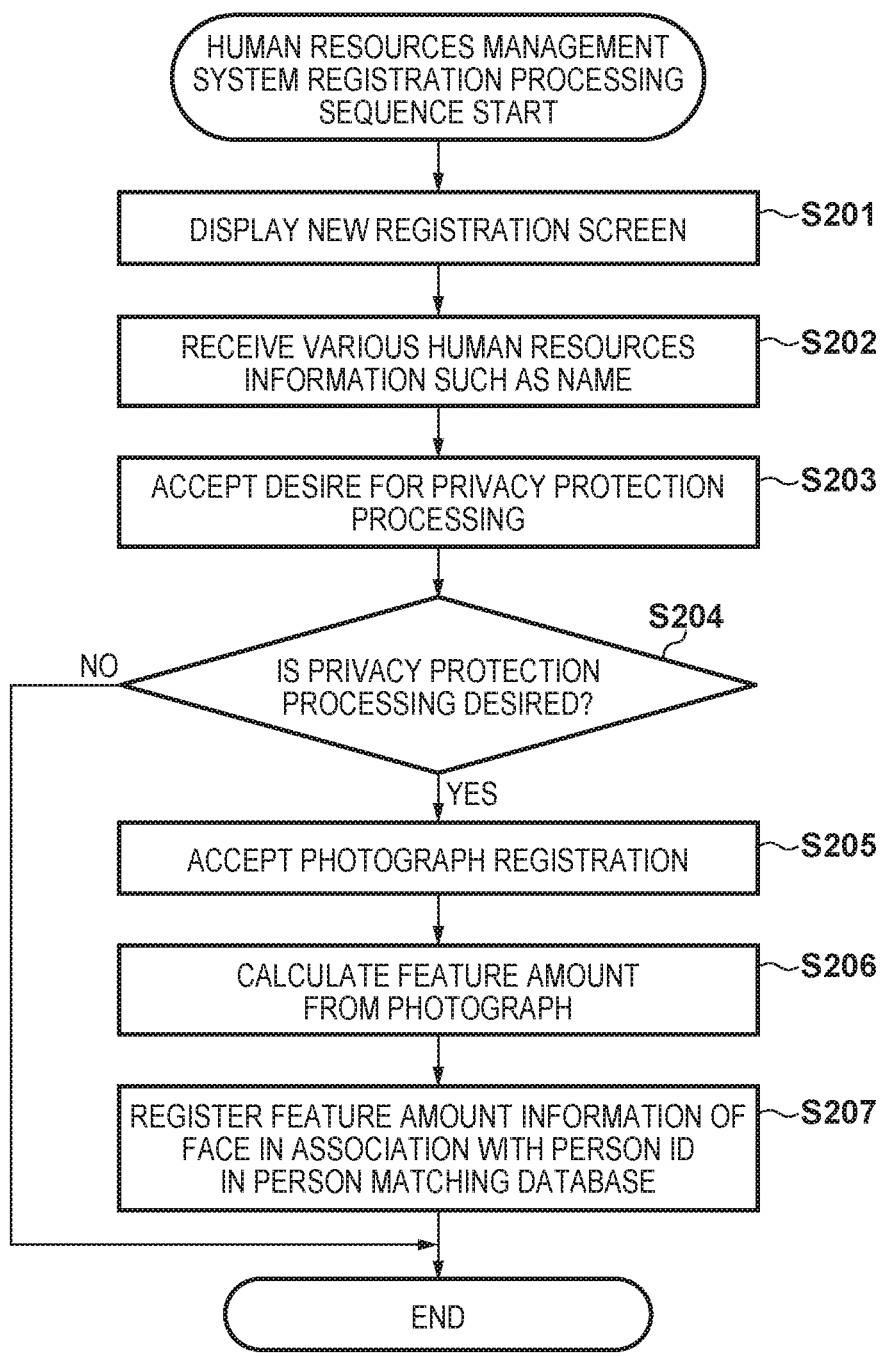

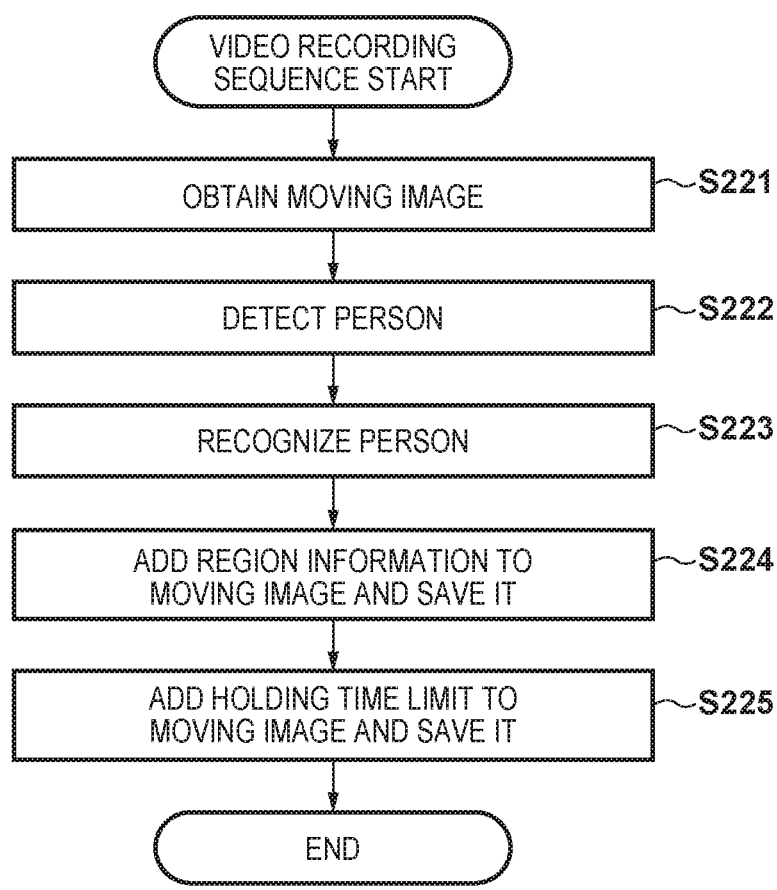

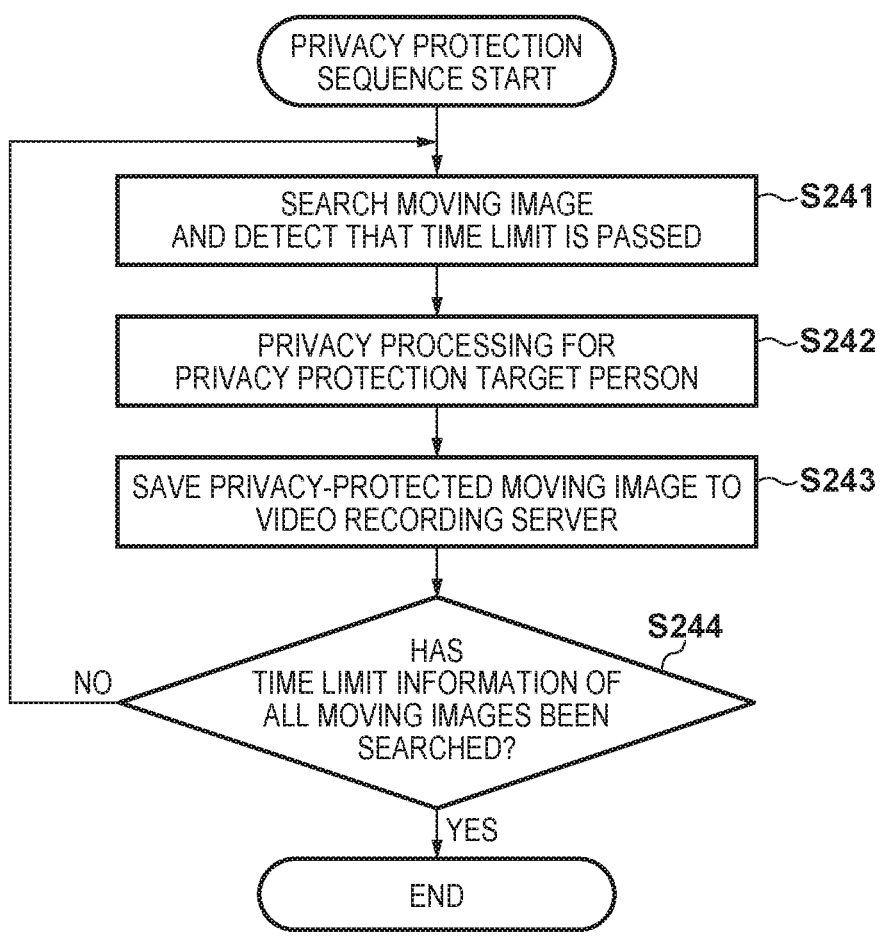

FIG. 4A

| PERSON ID | NAME | ... | CONTRACT EXPIRATION DATE | DESIRE FOR PRIVACY PROTECTION PROCESSING |
|---|---|---|---|---|
| AA001 | TARO SHIMEI | ... | 2017/6/30 | Y |
| AA002 | HANAKO NAMAE | ... | 2017/6/30 | N |
| ... | ... | ... | ... | ... |
| AA101 | JIRO MYOUJI | ... | 2017/12/31 | Y |
| ... | ... | ... | ... | ... |

FIG. 4B

| PERSON ID | FEATURE AMOUNT |
|---|---|
| AA001 | 0x123456789 |
| AA101 | 0x987654321 |
| ... | ... |

FIG. 4C

| MOVING IMAGE MANAGEMENT NUMBER | frameNo. | REGION INFORMATION | TIME LIMIT |
|---|---|---|---|
| 0101-1234-001 | 123 | (12,34), (56,78) | 2017/7/30 |
| 0101-1234-001 | 123 | (111,222), (333,444) | - |
| ... | ... | ... | ... |

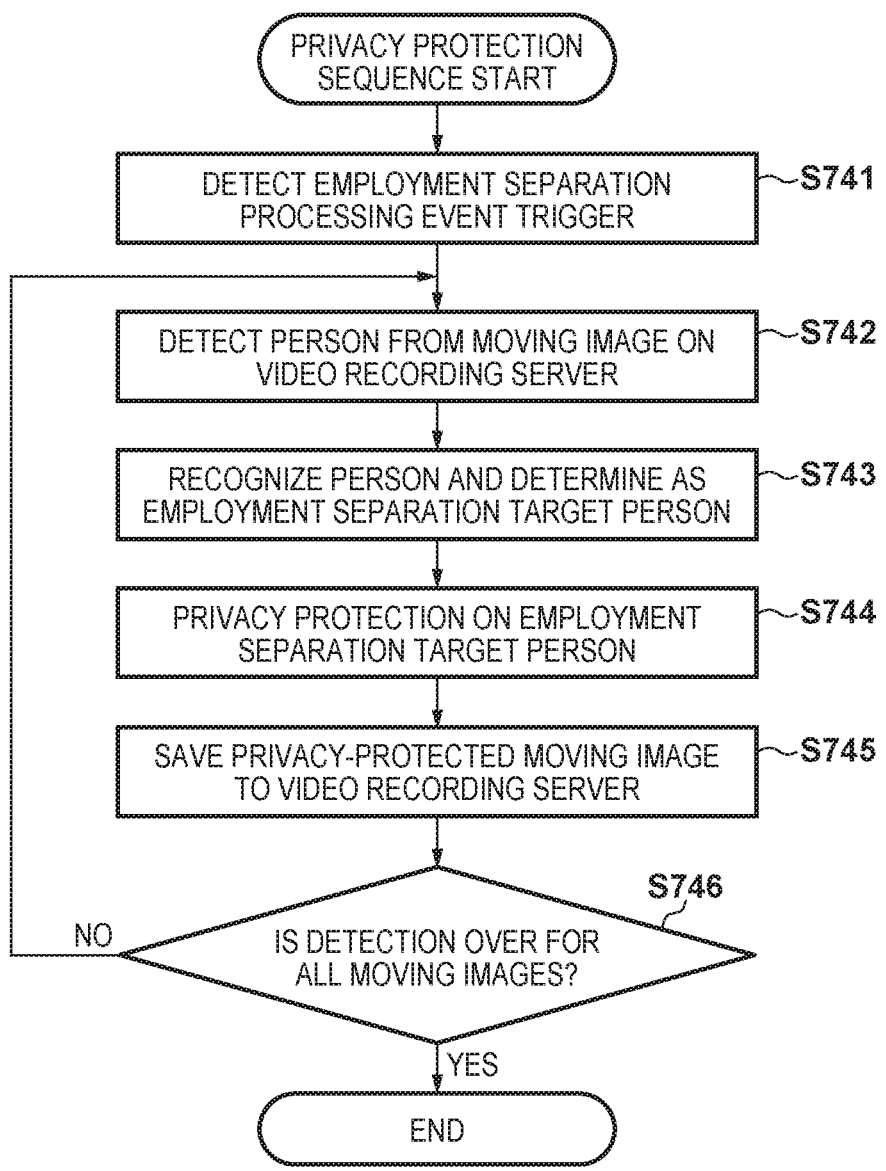

FIG. 8A

| HUMAN RESOURCES SYSTEM | | EDIT | EMPLOYMENT SEPARATION PROCESSING |

REGULAR EMPLOYEE / TERM CONTRACT EMPLOYEE

| SELECT | ID | NAME | ... | | | |
|--------|--------|-----------|-----|--|--|--|
| ○ | AAA001 | TARO KIYA | ... | | | |
| ● | AAA002 | JIRO YANO | ... | | | |
| ... | | ... | ... | | | |
| | | | | | | |
| | | | | | | |

FIG. 8B

HUMAN RESOURCES SYSTEM    EMPLOYMENT SEPARATION PROCESSING

EMPLOYMENT SEPARATION PROCESSING

PERFORM EMPLOYMENT SEPARATION PROCESSING FOR BELOW EMPLOYEE

NAME            JIRO YANO
DATE OF BIRTH   XX/XX/XX
...

NEXT

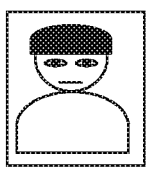

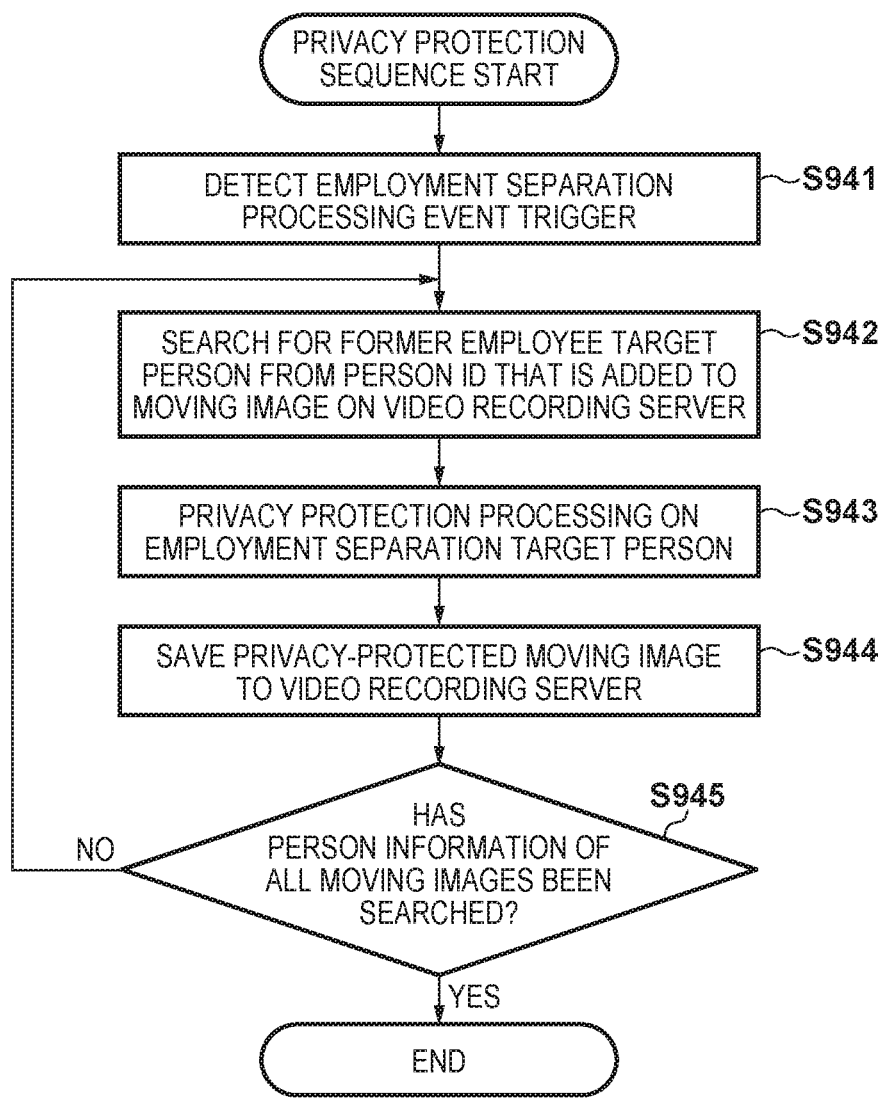

F I G. 10A

| PERSON ID | NAME | ... |
|---|---|---|
| AAA001 | TARO KIYA | ... |
| AAA002 | JIRO YANO | ... |
| ... | ... | ... |
| AAA101 | NONO SABURO | ... |
| ... | ... | ... |

F I G. 10B

| PERSON ID | FEATURE AMOUNT |
|---|---|
| AA001 | 0x123456789 |
| AA101 | 0x987654321 |
| ... | ... |

F I G. 10C

| MOVING IMAGE MANAGEMENT NUMBER | frameNo. | PERSON ID | REGION INFORMATION |
|---|---|---|---|
| 0101-1234-001 | 123 | AA001 | (12,34) , (56,78) |
| 0101-1234-001 | 123 | AB001 | (111,222) , (333,444) |
| ... | ... | ... | ... |

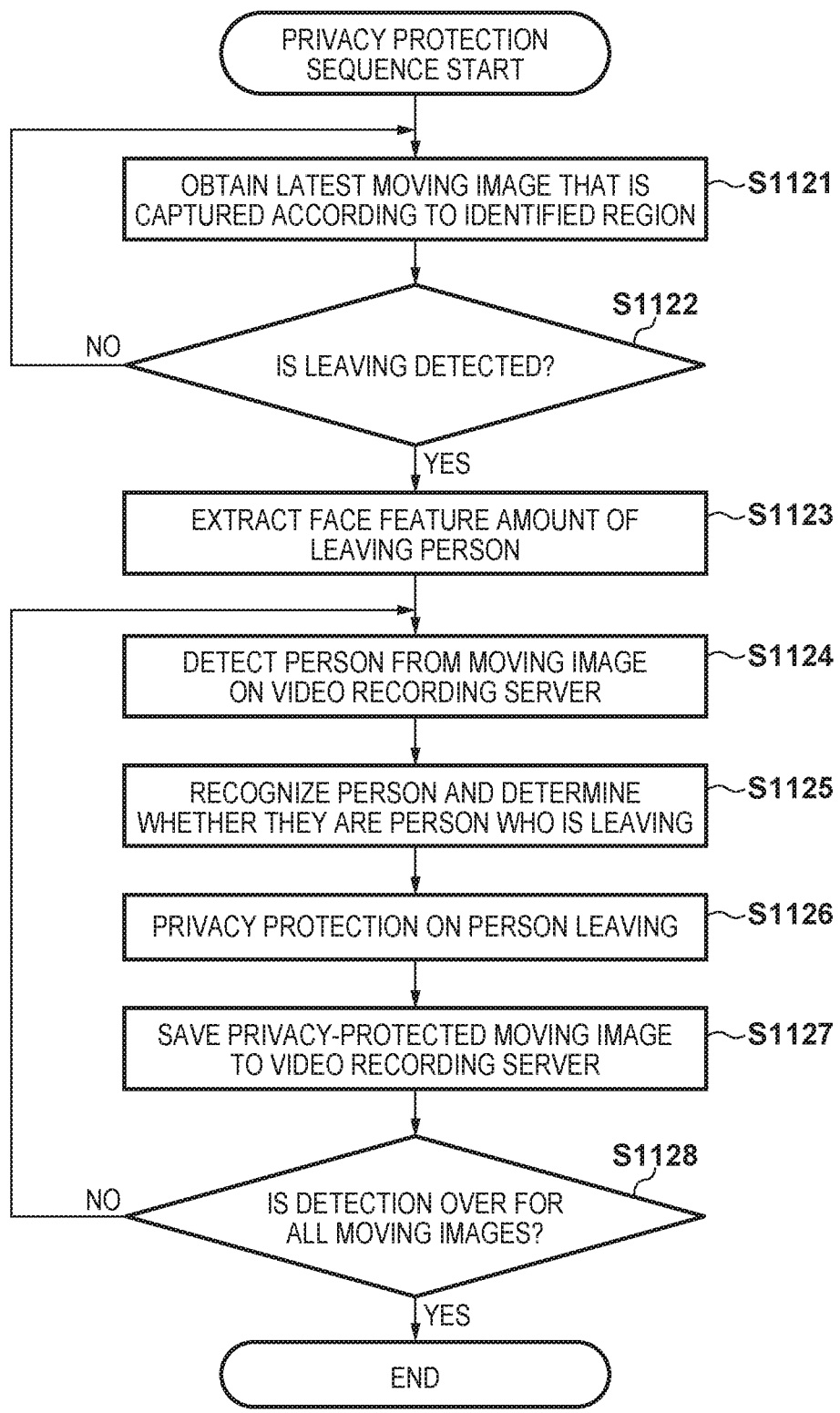

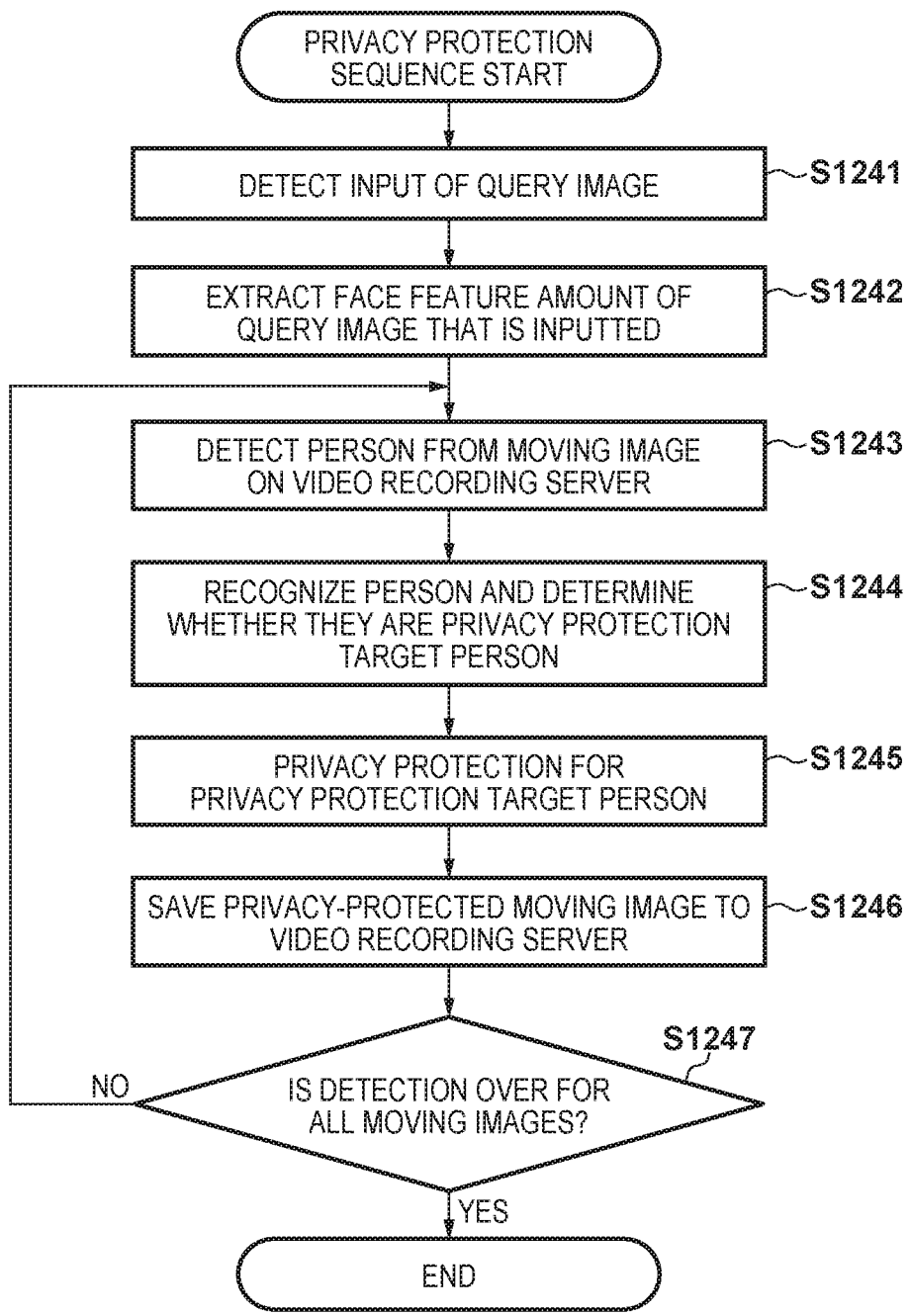

F I G. 13A
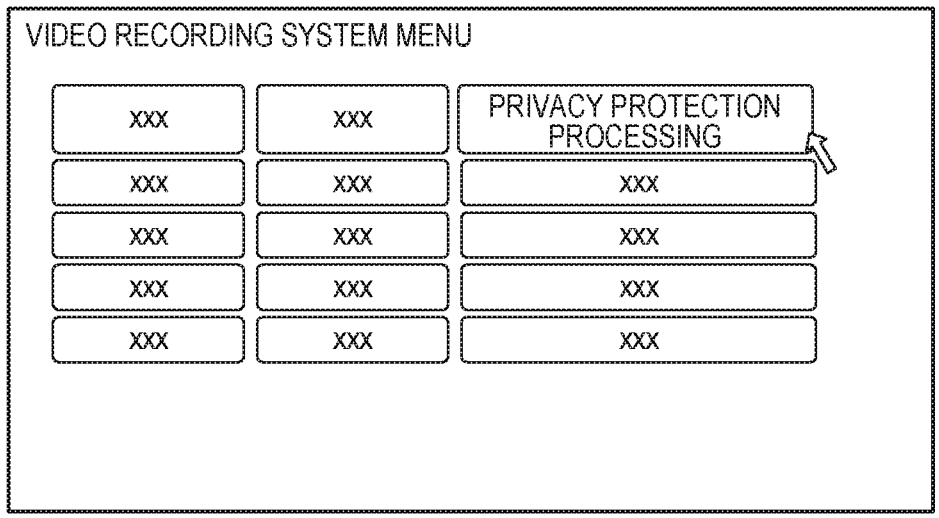
F I G. 13B
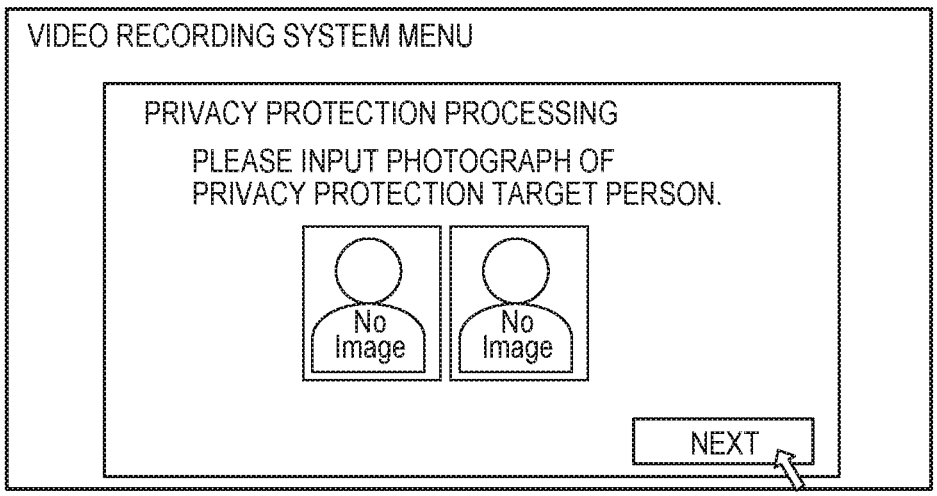

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present invention relates to an image processing apparatus, a method of controlling an image processing apparatus, and a storage medium.

Description of the Related Art

In recent years, while monitoring cameras are widely installed, the importance of protecting personal information that appears in an image captured by a monitoring camera is increasing.

Japanese Patent Laid-Open No. 2016-158156 discloses a technique for setting whether each region in a moving image should be a target of privacy protection processing, and performing privacy protection processing on only a moving body set as a privacy protection target.

In addition, Japanese Patent Laid-Open No. 2011-091705 discloses a technique for cancelling privacy protection of a moving body upon detecting the occurrence of a specific event (abandonment of an object) based on an image analysis result.

However, in the conventional techniques, there is the problem of inconvenience because it is not possible to flexibly apply processing for privacy protection.

The present invention is made in view of the foregoing problem, and provides a technique for realizing privacy protection that is more flexible and is more convenient.

SUMMARY OF THE INVENTION

According to one aspect of the present invention, there is provided an image processing apparatus, comprising: an obtainment unit configured to obtain an image captured by an image capturing apparatus; a recognition unit configured to recognize a person from the image obtained by the obtainment unit; a setting unit configured to set a time limit for the person to be recognized by the recognition unit; and a processing unit configured to execute processing for privacy protection on an image including the person for which the time limit set by the setting unit has been exceeded.

Further features of the present invention will be apparent from the following description of exemplary embodiments with reference to the attached drawings.

BRIEF DESCRIPTION OF THE DRAWINGS

FIG. 1 is a view illustrating an example of a configuration of an image processing system according to a first embodiment.

FIG. 2A through FIG. 2C are flowcharts for illustrating an example of processing by the image processing apparatus according to the first embodiment.

FIG. 4A through FIG. 4C are examples of data tables held by the image processing apparatus and the human resources management system according to the first embodiment.

FIG. 7A through FIG. 7C are flowcharts for illustrating an example of processing by the image processing apparatus according to the second embodiment.

FIG. 8A through FIG. 8D are views for illustrating an example of a user interface of a human resources management system according to the second embodiment.

FIG. 9A through FIG. 9C are flowcharts for illustrating an example of processing by the image processing apparatus according to a third embodiment.

FIG. 10A through FIG. 10C are examples of data tables held by the image processing apparatus and the human resources management system according to the third embodiment.

FIG. 11A through FIG. 11B are flowcharts for illustrating an example of processing by the image processing apparatus according to a fourth embodiment.

FIG. 12A through FIG. 12C are flowcharts for illustrating an example of processing by the image processing apparatus according to a fifth embodiment.

FIG. 13A through FIG. 13D are views for illustrating an example of a user interface of a human resources management system according to the fifth embodiment.

DESCRIPTION OF THE EMBODIMENTS

Figures 3A, 3B:
FIG. 3A through FIG. 3D are views for illustrating an example of a user interface of a human resources management system according to the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In the first embodiment, description is given for an example of, when a management time limit has been set in advance for a specific person (hereinafter, a privacy protection target person), detecting that a management time limit for a moving image has been exceeded, and implementing privacy protection processing. The present embodiment can be applied in the case where, for a recorded moving image, a management time limit is set for each employee (for example, the case where a registration time period is known in advance such as for a contract employee), for example. It is envisioned that processing for privacy protection is implemented on an image with respect to a contract employee who has separated from the company and whose management time limit has been exceeded.

Here, processing for privacy protection (hereinafter referred to as privacy protection processing) is processing for abstractifying (anonymizing) a person in a moving image. Specifically, this is abstractifying (anonymizing) to make a conversion to an image where it is hard to identify an individual person, such as by performing, on a person in the image, conversion to an image of only a silhouette or outline of a person, processing for replacement by a binary image, or mask processing (processing for covering and hiding by a rectangular or person-shaped image). Note that configuration may be such that a silhouette does not need to be shown as a black color, and it is sufficient if an outline and the interior of the outline are colors that can be distinguished from a background. In addition, a technique such as for performing mosaic processing or blur processing on a face region or a person region may be used.

<Configuration of Image Processing System>

FIG. 1 is a view illustrating an example of a configuration of an image processing system according to the present embodiment. An image processing system 1 includes an image capturing apparatus 111 and an image processing apparatus 100. Upon detecting an event where the privacy of a predetermined person should be protected, the image processing apparatus 100 performs privacy protection processing for that person. The image processing system 1 is a system that operates independently from a human resources management system 112 which manages employee information or the like, and can operate in cooperation with the human resources management system 112. In addition, the image processing system 1 can also refer to a person matching database 113. Note that the image processing system 1 may be configured by including the image capturing apparatus 111, the image processing apparatus 100, the human resources management system 112, and the person matching database 113.

The image capturing apparatus 111 is an apparatus provided with an image sensor that is CMOS or the like, for converting an optical image formed on a capturing surface to a digital electrical signal by a photo-electrical conversion. The image capturing apparatus 111 is a monitoring camera, for example, and obtains a still image or a moving image.

The image processing apparatus 100 is provided with an image obtainment unit 101, a saving unit 102, an event detection unit 103, a person recognition unit 104, a privacy processing unit 105, and a time limit setting unit 106. Function of each processing unit is realized by a non-illustrated control unit (for example, a CPU) reading a program saved in the saving unit 102, and executing it.

The image obtainment unit 101 obtains a still image or a moving image that is captured by the image capturing apparatus 111. The saving unit 102 is an apparatus for saving the still image or moving image obtained by the image obtainment unit 101, and is a hard disk, for example. Images saved in the saving unit 102 are images obtained by one of the image capturing apparatus 111 (a monitoring camera), or images captured by a plurality of image capturing apparatuses (monitoring cameras) that are managed by a video recording server (not shown) and are set in a monitoring target region. In addition, in the present embodiment, the saving unit 102 holds attribute information that corresponds to a moving image that is saved.

The event detection unit 103 detects a privacy protection event when an event for which privacy protection processing should be performed occurs. In the present embodiment, the event detection unit 103 performs a comparison between a time limit set by the time limit setting unit 106, which is described later, with respect to a moving image obtained by the image obtainment unit 101, and the current time, and detects that the time limit has been exceeded as an event.

The person recognition unit 104 detects a person in the moving image, and recognizes the detected person. For a method of human body detection, because it is acceptable if prior art such as HOG (Histograms of Oriented Gradients) disclosed by Dalal. N, Triggs. B, "Histograms of Oriented Gradients for Human Detection". is applied, a detailed description is omitted. In addition, as a method for recognizing a person, because it is acceptable to apply prior art such as face recognition disclosed in Japanese Patent Laid-Open No. 2016-009453, a detailed description is omitted.

The privacy processing unit 105 performs privacy protection processing when the person recognition unit 104 determines a person whose privacy should be protected. In the present embodiment, a person region is replaced with a silhouette of a person, but any method may be used if it is image processing that is performed in order to protect privacy. For example, configuration may be taken to use a method such as filling a person region detected by the person recognition unit 104 by a specific pixel value or multiplying the person region by a two-dimensional image having a specific pixel value.

For a moving image captured by the image capturing apparatus 111 and obtained by the image obtainment unit 101, the time limit setting unit 106 adds a time limit to the moving image based on an ID of a person recognized by the person recognition unit 104. For a moving image captured by the image capturing apparatus 111, in the present embodiment, for a person whose registration time period is known in advance such as a contract employee, a management time limit for saving moving images of this person is set. In the present embodiment, a person whose management time limit has been exceeded is a target of privacy protection.

<Processing>

Next, with reference to FIG. 2A through FIG. 2C, FIG. 3A through FIG. 3D, and FIG. 4A through FIG. 4C, description of a processing procedure implemented by the image processing apparatus 100 according to the present embodiment is given. FIG. 2A is an example of a human resources management system registration sequence, FIG. 3A through FIG. 3D is an example of a user interface (hereinafter, UI) of the human resources management system registration sequence. FIG. 4A through FIG. 4C are examples of respective database data tables. FIG. 4A is an example of a human resources data table of the human resources management system. FIG. 4B is an example of a table for persons and feature amounts of a person matching database. FIG. 4C is an example of moving image information table that is saved in the saving unit. It is envisioned that, for a human resources management system registration sequence, input is made at a contract time for a contract employee.

<Registration Sequence>

In step S201 of FIG. 2A, when a user selects a new registration button on a UI as illustrated in FIG. 3A, the human resources management system 112 displays a new registration window as illustrated in FIG. 3B.

In step S202, on the UI as illustrated in FIG. 3B, the human resources management system 112 accepts input of the registration information to the displayed new registration window in accordance with the operation in step S201. The accepted data is held in a database in the human resources management system 112.

Figures 3C, 3D:

In step S203, on a UI as illustrated in FIG. 3C, the human resources management system 112 accepts whether or not there is a desire for privacy protection processing after the expiration of the contract time limit for the contract employee. The accepted data which is registered in step S202 is held in a database in the human resources management system 112 that is illustrated in FIG. 4A. In FIG. 4A, a case of desiring privacy protection processing is represented by ○, and a case of not desiring privacy protection processing is represented by x.

In step S204, the human resources management system 112 transitions to the processing of step S205 when privacy protection processing is desired, and ends the human resources management system registration processing sequence when privacy protection processing is not desired.

In step S205, on a UI as illustrated in FIG. 3D, the human resources management system 112 accepts registration of a photograph. A human resources staff member registers a photograph (for example, a face photograph) of a contract employee who desires privacy protection processing. For example, photograph data for generation of an ID card is registered to this UI.

In step S206, the human resources management system 112 transmits the registered photograph and registered person ID to the person recognition unit 104 of the image processing apparatus 100, and the person recognition unit 104 calculates a feature amount of the received photograph.

In step S207, the person recognition unit 104 registers the feature amount calculated in step S206 in the person matching database 113 illustrated in FIG. 4B, in association with the received person ID. Here, the registered person ID is the same person ID as the person ID managed by the human resources management system 112. The above is the flow for the series of processing for FIG. 2A.

<Video Recording Sequence>

Next, FIG. 2B is an example of a video recording sequence according to the present embodiment. The video recording sequence is processing for dividing a moving image continuously captured by the image capturing apparatus 111 (a monitoring camera or the like) by a predetermined time interval, and storing it in a hard disk drive of the saving unit 102 or a video recording server, and this is processing is continuously performed.

In step S221, the image obtainment unit 101 obtains the moving image captured by the image capturing apparatus 111. In step S222, for the moving image obtained by the image obtainment unit 101, the person recognition unit 104 further divides the moving image, which is divided by the predetermined time interval, into frame images, and performs person detection processing.

In step S223, the person recognition unit 104 performs recognition of a detected person. More specifically, for all frame images, face regions are identified from detected person region information, and a feature amounts for the face regions are extracted. The person recognition unit 104 matches the extracted feature amounts of the face regions with feature amounts saved in the person matching database 113, and obtains a person ID. After performing processing for all frame images, the person recognition unit 104 outputs the moving image, a frame number, and a person detection region to the saving unit 102, to register data in a table as in FIG. 4C.

At the same time, the person ID is output to the time limit setting unit 106. Note that there is no limitation to being able to obtain a person ID for each person in every frame image. For example, since a person for which whether or not to perform privacy protection is registered as "not desired" in the human resources management system registration sequence is not registered in the person matching database 113, a person ID is not obtained.

In step S224, the saving unit 102 stores person region information and the frame number outputted from the person recognition unit 104 in association with a moving image management number. For example, the moving image management number, the frame number, and the person region information are associated and stored in a table as illustrated in FIG. 4C.

In step S225, the time limit setting unit 106 obtains a contract expiration date corresponding to the person ID from the human resources management system 112, and calculates a holding time limit based on the contract expiration date. In the present embodiment, it is assumed that one month after the contract expiration date is calculated as a holding time limit. The calculated holding time limit is saved in association with the moving image management number saved in step S224. For example, it is saved by being added to the table as illustrated in FIG. 4C. A time limit is not set in a case of a person who does not desire privacy protection processing, as with the person ID "AA002" in FIG. 4A. In addition, a time limit is similarly not set for an employee who does not have a contract expiration date. In contrast, for an employee whose contract time limit is decided as with a contract employee, a time limit (Jul. 30, 2017 when the contract expiration date is Jun. 30, 2017, for the person corresponding to the person ID "AA001") is set. The above is the flow for the series of processing for FIG. 2B.

<Privacy Protection Sequence>

Next, FIG. 2C is an example of a privacy protection sequence according to the present embodiment. In the privacy protection sequence, when an event where privacy protection of a predetermined person should be performed is detected, privacy protection processing is performed with respect to a recorded moving image captured by a video recording sequence.

In step S241, the event detection unit 103 searches attribute information (for example, a data table as illustrated in FIG. 4C) of moving images saved in the saving unit 102 or the video recording server (not shown). A time limit set by the time limit setting unit 106 and the current time are compared, and it is detected that the time limit has arrived. In the present embodiment, it is assumed that searching starts periodically by batch processing.

In step S242, for each frame image, the privacy processing unit 105 performs privacy protection processing on a person region (a privacy protection target person) corresponding to the time limit arrival detected by the event detection unit 103. More specifically, it uses a background image from the detection region of the privacy protection target person to perform a background difference and also perform binarization processing, extracts binary silhouette information, overlaps the silhouette information on the background image, and replaces the detection region with a source image. Consequently, an image in which the target person is converted to a silhouette is generated. For the background image, for example a moving image before or after that was saved in step S224 may be used, and an image frame in which a person is not present may be used as the background image. In the present embodiment, description of an example for performing privacy protection processing by the method described above was given, but any method is sufficient if it is a method for making a conversion to a still image or a moving image in which a person cannot be identified.

Figure 5A:
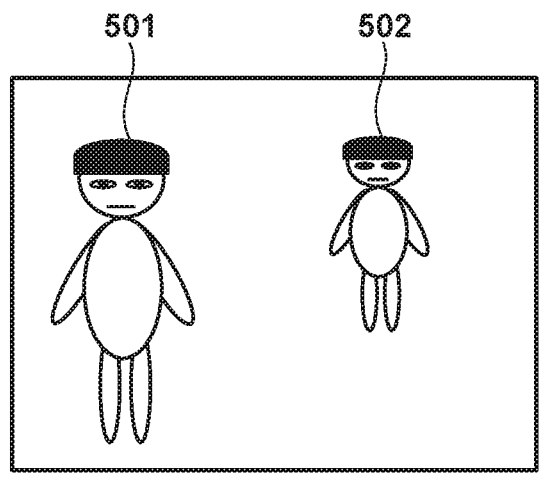
FIG. 5A through FIG. 5B are examples of frame images for before and after privacy protection processing according to the first embodiment.
Figure 5B:
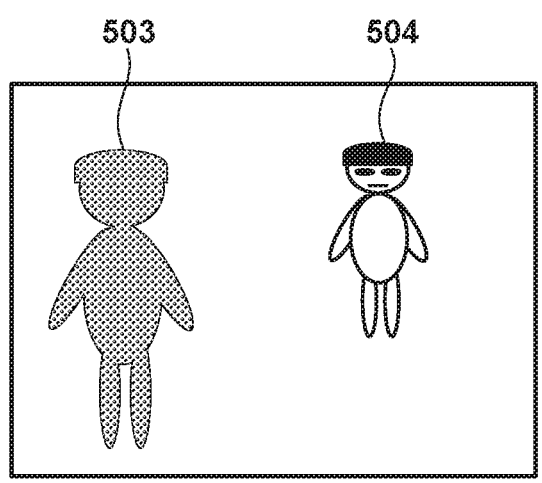

Here, FIG. 5A through FIG. 5B are used to give a description regarding frame images before and after the processing of step S242. FIG. 5A through FIG. 5B are images before and after processing of a frame image by the privacy processing unit 105. FIG. 5A is a frame image for before privacy protection processing. Reference numeral 501 is a person recognized as a privacy protection target person, and reference numeral 502 is a person not recognized as a privacy protection target person. FIG. 5B is a frame image after privacy protection processing of the same frame as that of FIG. 5A. Reference numeral 503 is a privacy protection target person after the privacy protection processing, and reference numeral 504 is a person who is not a target of privacy protection after the processing. As in FIG. 5B, for a privacy protection target person, their personal information is protected because there was a conversion to a privacy-protected moving image, in other words a moving image where it is not possible to identify an individual person. Note that illustration is given here of an example in which privacy protection processing is performed for only the privacy protection target person 501, but privacy protection processing may be performed for all persons appearing in a moving image where a privacy protection target person appears.

In step S243, the privacy processing unit 105 uses the image subject to privacy protection processing in step S242 to generate an H.264 format moving image, and saves it in the saving unit 102 or the video recording server (not shown). In such a case, a source moving image that is not subject to privacy protection is deleted. In addition, in step S243, information corresponding to a person region and frames for which processing was performed from the tables illustrated in FIG. 4A through FIG. 4C are deleted. Note that, description is given here of an example in which an original moving image that is not subject to privacy protection is deleted, but authority may be added to an administrator and it may be held in a state where it can only by viewed by the administrator, for example.

In step S244, the event detection unit 103 determines whether searching of the moving image and the time limit information corresponding to the moving image has ended. If it has ended, the privacy protection sequence ends. Meanwhile, if it has not ended, the processing returns to step S241. The above is the flow for the series of processing for FIG. 2C.

As described above, in the present embodiment, when a management time limit is set in advance for a privacy protection target person, it is detected that the management time limit for a moving image has arrived, and privacy protection processing is performed. Accordingly, it is possible to reduce a cost for a monitoring-moving-image administrator managing personal information. Accordingly, it is possible to realize privacy protection that is more flexible and has high convenience.

Second Embodiment

In the present embodiment, description is given of an example in which, when an event where privacy protection processing should be performed on a recorded moving image of a specific person is detected, a moving image of the person is found from the recorded moving image, and privacy protection processing is performed on regions of the person. In the present embodiment, in particular description is given of an example where, for a recorded moving image, if a certain employee has undergone employment separation at a certain time, privacy protection processing is performed with respect to a recorded moving image of the employee.

<Configuration of Image Processing System>

Figure 6:
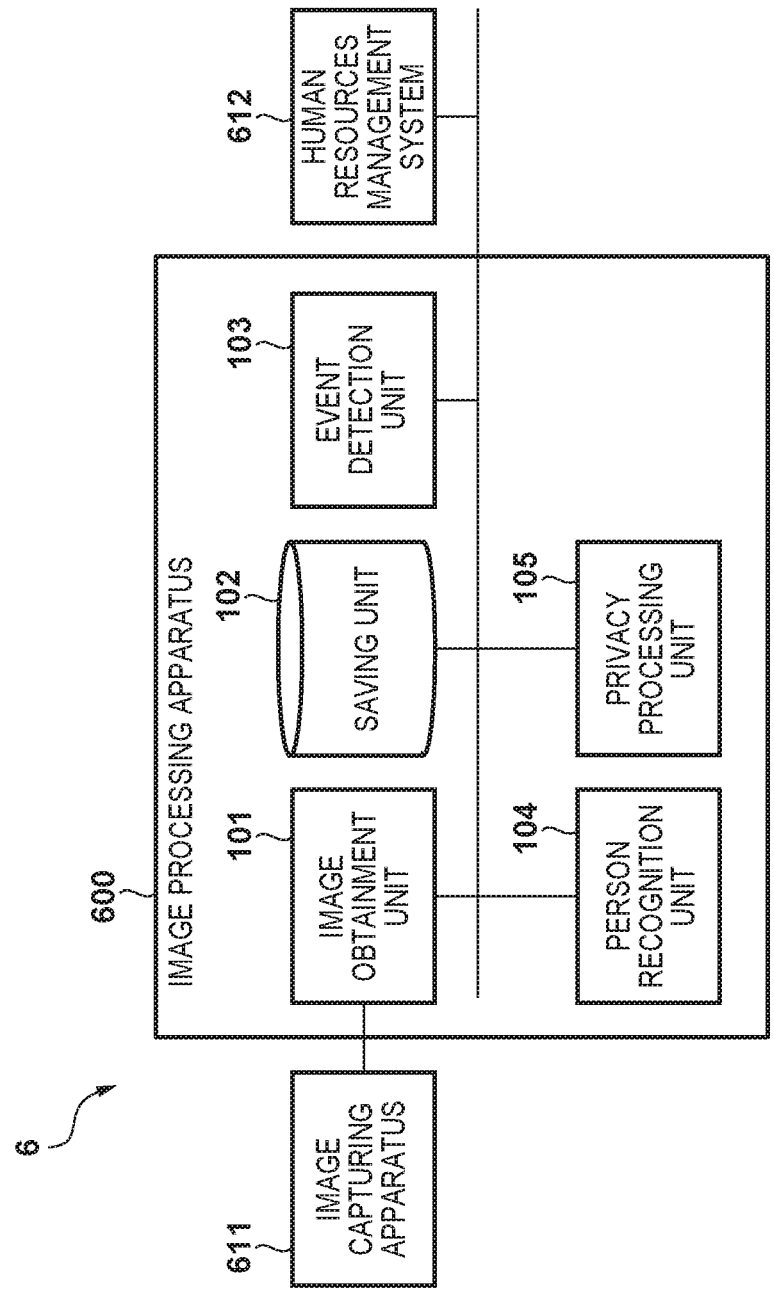
FIG. 6 is a view illustrating an example of a configuration of an image processing apparatus according to a second embodiment.

FIG. 6 is a view illustrating an example of a configuration of the image processing system according to the present embodiment. An image processing system 6 includes an image capturing apparatus 611 and an image processing apparatus 600. Out of the configuration elements of the image processing apparatus 100 described by FIG. 1, the image processing apparatus 600 is provided with the configuration elements other than the time limit setting unit 106.

The event detection unit 103 according to the present embodiment detects that an event where privacy protection processing should be performed has occurred. In the present embodiment, the image processing system 6 is assumed to cooperate with an external human resources management system 612, and when a human resources administrator executes employment separation processing for a certain employee through the human resources management system 612, it is assumed to receive an event trigger therefor. Note that, in the present embodiment, it is assumed that an employment separation processing event trigger is received, but the event trigger that the image processing system 6 receives may be any event trigger. Functions of other configuration elements of the image processing apparatus 600 are the same as functions of respective configuration elements of the image processing apparatus 100 described by FIG. 1, and thus description thereof is omitted.

<Processing>

Next, with reference to FIG. 7A through FIG. 7C, and FIG. 8A through FIG. 8D, description is given of a processing procedure implemented by the image processing apparatus 600 according to the present embodiment.

<Video Recording Sequence>

Figure 7A:
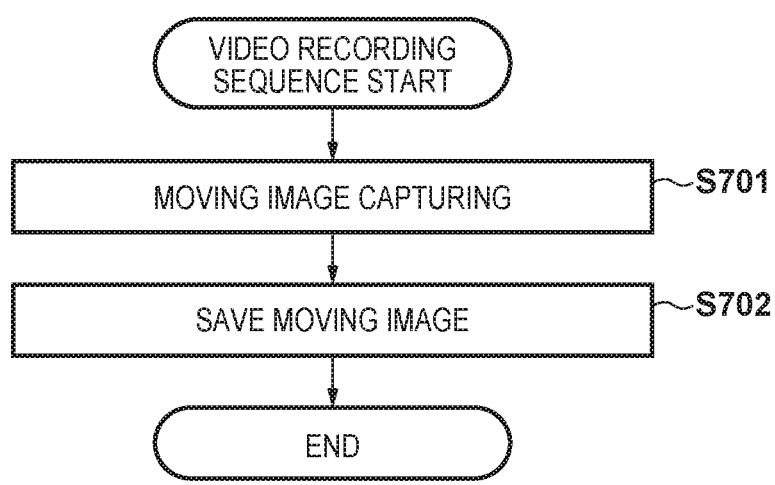

FIG. 7A is an example of a video recording sequence according to the present embodiment. In step S701, the image obtainment unit 101 obtains the moving image captured by the image capturing apparatus 611. Note that, an obtainment source of a moving image is not limited to one monitoring camera (the image capturing apparatus 611), and moving images of all monitoring cameras set in a monitoring target region may be obtained. In step S702, the saving unit 102 saves the moving image obtained by the image obtainment unit 101. It is assumed that the moving image is saved after being divided by the predetermined time interval. The above is the flow for the series of processing for FIG. 7A.

<Employment Separation Processing Sequence>

Figure 7B:
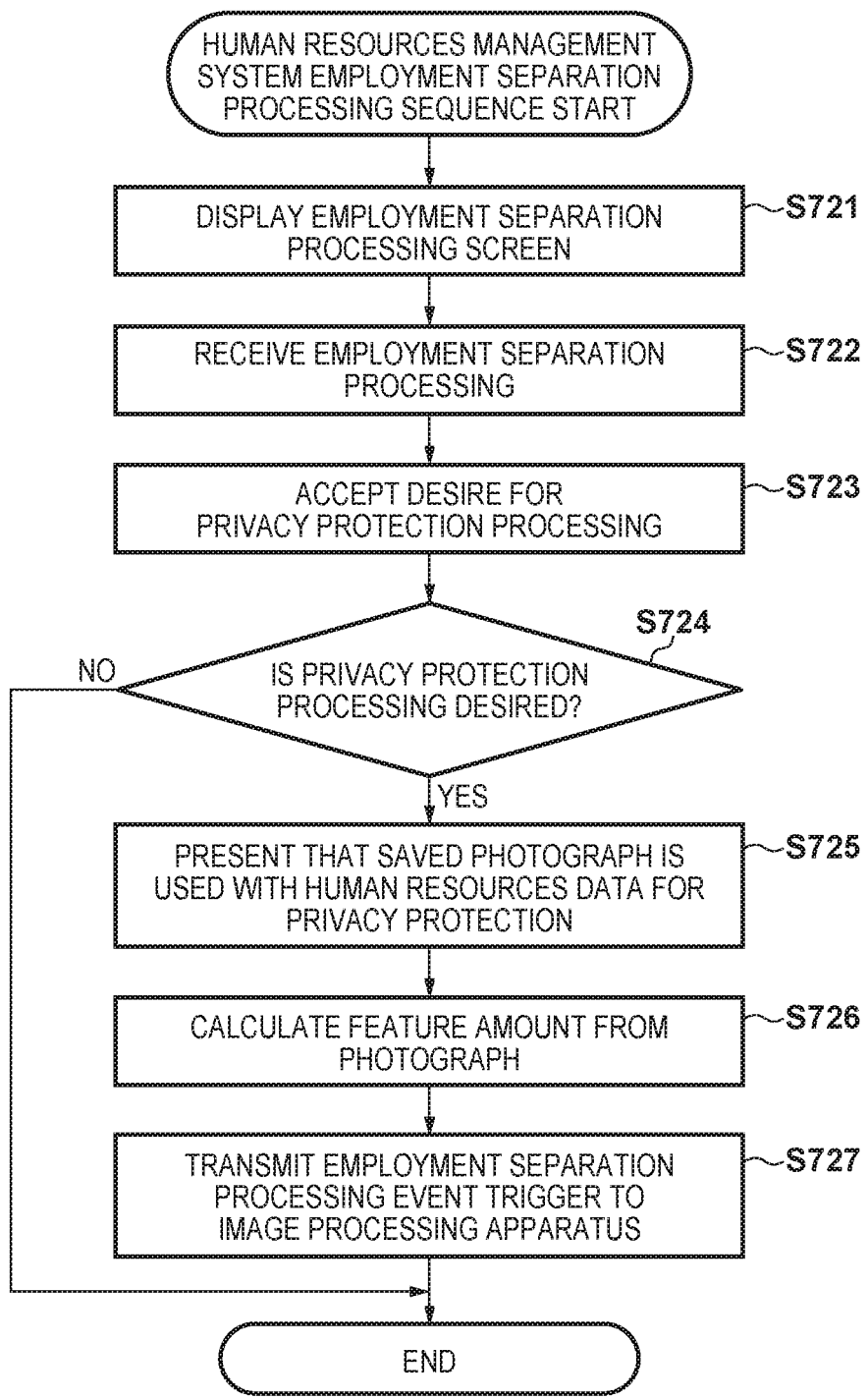

Next, FIG. 7B is an example of an employment separation processing sequence of the human resources management system 612. In addition, FIG. 8A through FIG. 8D are examples of UIs for employment separation processing of the human resources management system 612.

In step S721, when a user selects an employment separation processing button on a UI as illustrated in FIG. 8A, the human resources management system 612 displays an employment separation processing window as illustrated in FIG. 8B. In step S722, the human resources management system 612 accepts employment separation processing on the UI illustrated in FIG. 8B.

In step S723, the human resources management system 612 displays a UI as illustrated in FIG. 8C in order to accept a selection of whether a former employee desires that privacy protection processing be performed on monitoring camera images. In step S724, the human resources management system 612 advances the processing to step S725 if the former employee desires privacy protection processing, and ends the processing if the former employee does not desire privacy protection processing.

In step S725, the human resources management system 612 presents using privacy protection on photograph data saved in association with human resources data on a UI as illustrated in FIG. 8D. In addition, the presented photograph data is transmitted to the person recognition unit 104 of the image processing apparatus 600. Note that, saved photograph data is used here, but new photograph data may also be accepted.

In step S726, the person recognition unit 104 calculates a feature amount from the received photograph data. The calculated feature amount is held by the person recognition unit 104. In step S727, the human resources management system 612 transmits an employment separation processing event trigger to the image processing apparatus 600. The above is the flow for the series of processing for FIG. 7B.

<Privacy Protection Sequence>

Next, FIG. 7C is an example of a privacy protection sequence according to the present embodiment. In step S741, the event detection unit 103 detects an event where the privacy of a privacy protection target person should be protected. In the present embodiment, the event detection unit 103 detects an employment separation processing event trigger transmitted from the external human resources management system 612, and transmits an event detection trigger to the person recognition unit 104. In such a case, information of a person ID of the person who is the privacy protection target person is obtained, and transmitted to the person recognition unit 104.

In step S742, upon obtaining the event detection trigger, for each moving image saved in the saving unit 102 or the video recording server (not shown), the person recognition unit 104 divides the moving image into frame images and starts detection of one or more persons.

In step S743, the person recognition unit 104 performs recognition of a detected person. More specifically, for all frame images, a face region is identified from a detected person region, and a feature amount for the face region is extracted. The person recognition unit 104 performs matching between the feature amount calculated in step S726 in advance and the extracted feature amount, and, when a match is able to be made to the same person, recognizes them as an employment separation target person. After processing is performed for all frame images, the person recognition unit 104 transmits detection region information for the person recognized as the employment separation target person, the frame number and the moving image to the privacy processing unit 105.

In step S744, the privacy processing unit 105 performs privacy protection processing for the privacy protection target person for each frame image. Because details of the privacy protection processing is similar to the processing of step S242, description thereof is omitted.

In step S745, the privacy processing unit 105 uses the image subject to privacy protection processing in step S744 to generate an H.264 format moving image, and saves it in the saving unit 102 or the video recording server (not shown). In this case, the source moving image which is not subject to privacy protection is deleted from the saving unit 102 or the video recording server (not shown).

In step S746, the person recognition unit 104 determines whether detection of persons in a moving image saved in the saving unit 102 or the video recording server (not shown) has ended. When detection of persons has ended, the processing ends. Meanwhile, when detection of persons has not ended, the processing returns to step S742. The above is the flow for the series of processing for FIG. 7C.

As described above, in the present embodiment, when an event where privacy protection processing should be performed on a recorded moving image of a specific person is detected, the person is searched for in recorded moving images that were recorded by any monitoring camera, and privacy protection processing is performed on regions of that person. Accordingly, it is possible to reduce a cost of a monitoring-moving-image administrator managing personal information that is in a moving image. Accordingly, it is possible to realize privacy protection that is more flexible and highly convenient.

Third Embodiment

In the second embodiment, description was given for an example in which, when an event where privacy protection processing should be performed for a specific person occurs, the person is searched for in recorded moving images, and privacy protection processing is performed. In contrast to this, in the present embodiment, description is given of an example of adding person IDs to a moving image in advance when obtaining and saving a moving image from a monitoring camera (an image capturing apparatus). Note that, in the present embodiment, similarly to in the second embodiment, description is given of an example of, for a recorded moving image, when a predetermined employee has undergone employment separation at certain time, a person ID added to the moving image is used to perform privacy protection processing on a recorded moving image of the employee. Note that, a configuration of the image processing system (image capturing apparatus, image processing apparatus) according to the present embodiment is similar to that of the second embodiment, and thus description thereof is omitted.

Figure 9A:
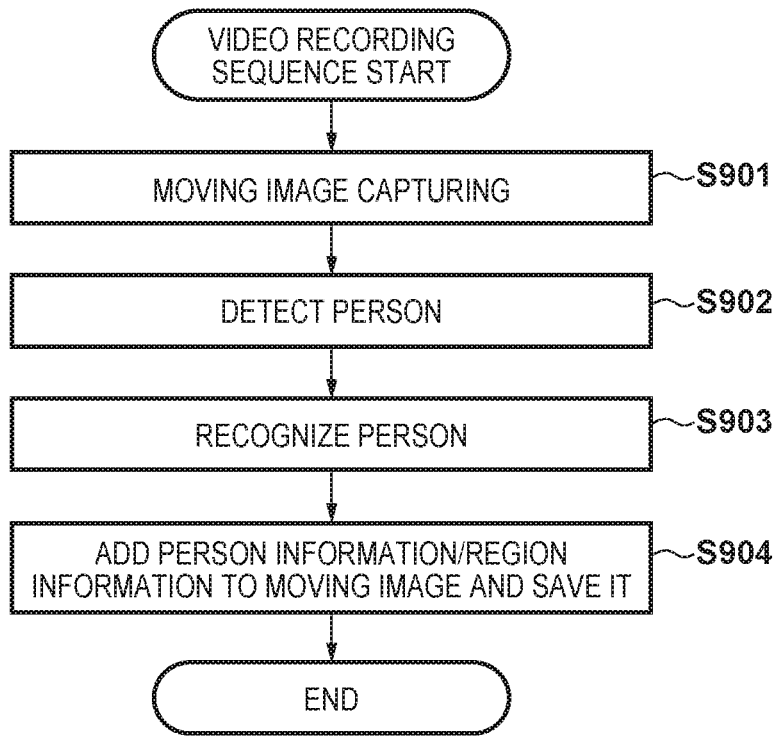
Figure 9B:
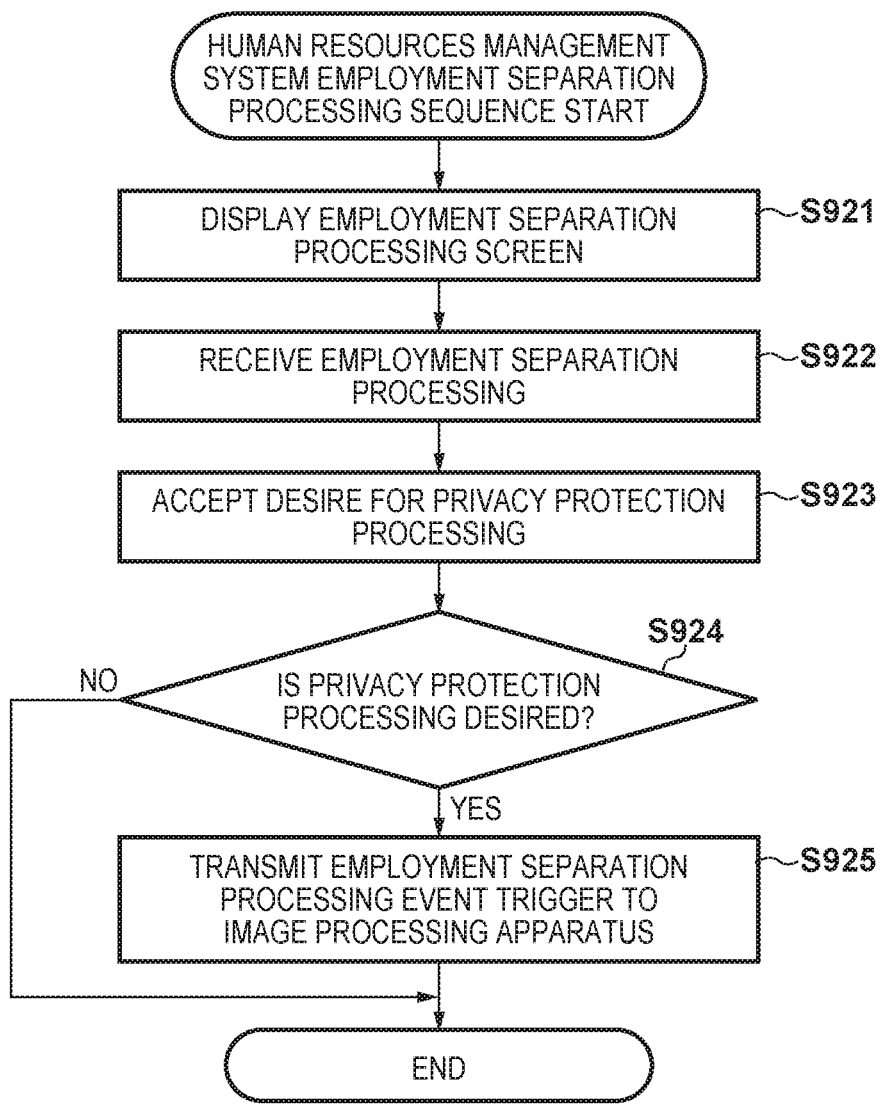

FIG. 9A through FIG. 9C are flowcharts for illustrating a procedure of processing performed by the image processing apparatus 600 according to the present embodiment. In addition, FIG. 10A through FIG. 10C are examples of data tables held by the image processing apparatus and the human resources management system according to the present embodiment.

Firstly, using FIG. 10A through FIG. 10C, description is given regarding various data tables held by respective apparatuses. FIG. 10A is a human resources information data table, and is held in a database (not shown) in the human resources management system 612 in which a person ID, a name, and the like are associated. The human resources information data table in the present embodiment does not hold information on whether or not there is a desire for privacy protection processing as illustrated in FIG. 4A. FIG. 10B is a data table in which a person ID and a face feature amount are associated, and is similar to the data table of FIG. 4B. FIG. 10C is a data table for attribute information associated with a moving image, and the data table is held in the saving unit 102. A person ID is added to attribute information of the present embodiment, and information relating to a time limit as illustrated in FIG. 4C is not included.

<Processing>

Next, with reference to FIG. 9A through FIG. 9C, description is given of the processing procedure implemented by the image processing apparatus 600 according to the present embodiment.

<Video Recording Sequence>

FIG. 9A is an example of a video recording sequence according to the present embodiment. Respective processing of step S901 through step S904 is similar to respective processing of step S221 through step S224 of FIG. 2B. However, the information saved by the saving unit 102 in step S904 is saved in associated with person region information, a person ID, a frame number, and a moving image management number as the data table illustrated in FIG. 10C. In the present embodiment, information relating to the time limit of a moving image as illustrated in FIG. 4C is not included.

<Employment Separation Processing Sequence>

Next, FIG. 9B is an employment separation processing sequence of the human resources management system 612. Respective processing of step S921 through step S925 is similar to respective processing of step S721 through step S724 and step S727. However, in the processing of step S925, the human resources management system 612 transmits to the image processing system 6 an employment separation processing event trigger, and also transmits an employment separation target person person ID.

<Privacy Protection Sequence>

Next, FIG. 9C is an example of a privacy protection sequence according to the present embodiment. In step S941, the event detection unit 103 detects an event where the privacy of a privacy protection target person should be protected. In the present embodiment, the event detection unit 103 detects employment separation event processing from the external human resources management system 612, and transmits an event detection trigger to the person recognition unit 104. In such a case, information of a person ID of the person who is the privacy protection target person is outputted to the privacy processing unit 105.

In step S942, the privacy processing unit 105 refers to the person ID information added to the moving image saved in the saving unit 102 or the video recording server (not shown), and searches for the person ID of a former employee who is the privacy protection target person obtained in step S941. Specifically, the person ID of the privacy protection target person is searched for in the data table illustrated in FIG. 10C, and person region information and a moving image associated with the moving image management number are obtained.

In step S943, the privacy processing unit 105 performs privacy protection processing for the privacy protection target person for each frame image. Because details of the privacy protection processing is similar to that of step S242, description thereof is omitted.

In step S944, the privacy processing unit 105 uses the image subject to privacy protection processing in step S943 to generate an H.264 format moving image, and saves it in the saving unit 102 or the video recording server (not shown). In such a case, a source moving image that is not subject to privacy protection is deleted. In addition, in step S944, information corresponding to the person ID of the privacy protection target person is deleted from the table illustrated in FIG. 10C.

In step S945, the privacy processing unit 105 determines whether the search for the person ID in the table illustrated in FIG. 10C has ended. When the search has ended the processing ends. Meanwhile, when searching has not ended, the processing returns to step S942. The above is the flow for the series of processing for FIG. 9C.

As described above, in the present embodiment, when obtaining and saving a moving image from a monitoring camera, person IDs are added to the moving image in advance, these person IDs are searched for the person ID of a privacy protection target person, and privacy protection processing is performed on images. Consequently, because effort for detecting the corresponding person from the images is eliminated, searching for a privacy protection target person becomes more convenient, and it is possible to further reduce cost of a monitoring-moving-image administrator managing personal information in the moving images. Accordingly, it is possible to realize privacy protection that is more flexible and highly convenient.

Fourth Embodiment

In the fourth embodiment, description is given of an example in which, when someone leaving a specific region is detected, privacy protection processing is performed on the corresponding person. The present embodiment can be applied to a case where a source image with no privacy protection is saved in a case where a person is inside a store, and privacy protection processing is performed when the person has left the store.

Note that a configuration of the image processing system (image capturing apparatus, image processing apparatus) according to the present embodiment is similar to that of FIG. 6, but a human resources management system is unnecessary, and processing of the event detection unit 103 is different. The event detection unit 103 according to the present embodiment detects that a person has left a specific region (for example, leaving a store). More specifically, a monitoring camera (image capturing apparatus) is installed at the entrance of a store, a person leaving a specific region in the store (for example, near the entrance) captured by the monitoring camera is detected, and privacy protection processing is performed with respect to images of the person who has left.

<Processing>

Figure 11A:
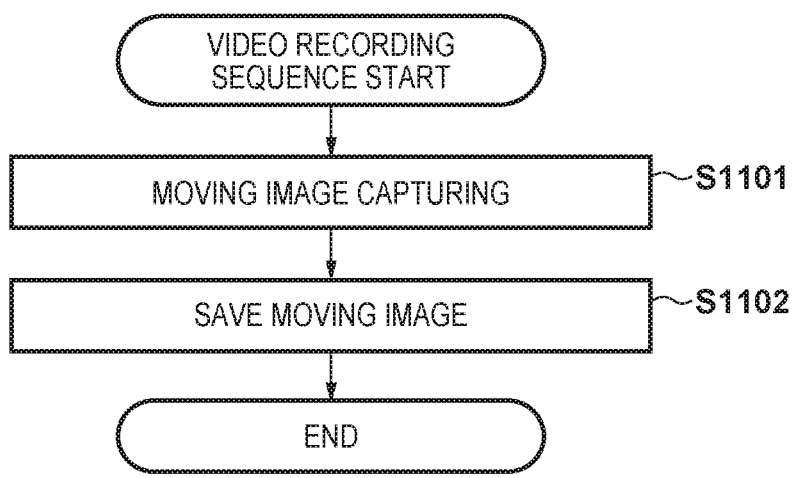

Next, with reference to FIG. 11A through FIG. 11B, description is given of the processing procedure implemented by the image processing apparatus 600 according to the present embodiment.

<Video Recording Sequence>

FIG. 11A is an example of a video recording sequence according to the present embodiment, but because respective processing of step S1101 and step S1102 is similar to respective processing of step S701 and step S702 described with reference to FIG. 7A in the second embodiment, description thereof is omitted.

<Privacy Protection Sequence>

Next, FIG. 11B is an example of a privacy protection sequence according to the present embodiment.

In step S1121, the image obtainment unit 101 obtains a newest image captured for a specific region. In the present embodiment, an image from a monitoring camera (the image capturing apparatus 611) installed at the entrance of a store is obtained.

In step S1122, the event detection unit 103 detects a person from image obtained by the image obtainment unit 101 and determines whether the person has left the specific region. For example, the leaving determination is performed by using the person detection technique previously described to detect that a center coordinate of a bottom edge of a person region is in the specific region. In the present embodiment, description is given of an example in which someone leaving a specific region is detected, but any method, such as a method where a passage line is set and passage through the passage line is detected, may be used if it is possible to detect a person leaving a specific region. When someone leaving is detected, the processing proceeds to step S1123. If leaving is not detected, the processing returns to step S1121.

In step S1123, the person recognition unit 104 extracts a feature amount (for example a feature amount of a face region) from the image of the person region detected in step S1122. Because the respective processing of the subsequent step S1124 through step S1128 is similar to the respective processing of step S742 through step S746 of FIG. 7C, except for that the subject of the processing is a person leaving and not an employment separation target person, description thereof is omitted. The above is the flow for the series of processing for FIG. 11B.

As described above, in the present embodiment, when a person leaving is detected for a specific region, a feature amount of the person is used to perform privacy protection processing on the person in a moving image saved in a saving unit or a video recording server. Accordingly, it becomes possible to automatically protect the privacy of a customer who enters a store, and it becomes possible to reduce the cost of a monitoring-moving-image administrator managing personal information in a moving image. Accordingly, it is possible to realize privacy protection that is more flexible and has high convenience.

Note that description is given in the present embodiment of an example in which privacy protection processing is performed in response to detecting a person leaving a specific region, but configuration may be taken to perform privacy protection processing in response to detecting a person entering a specific region. In such a case, for example, configuration may be taken such that a monitoring camera (image capturing apparatus) installed at the entrance of a store captures a region inside and outside of the store, and detects leaving the store in accordance with a person entering the region outside of the store in the image.

Fifth Embodiment

In the fifth embodiment, description is given of an example in which, when a request for privacy protection processing from a person appearing in a moving image is received, privacy protection processing is performed for the person in moving images captured in the past.

Note that, a configuration of the image processing system (image capturing apparatus, image processing apparatus) according to the present embodiment is similar to that of the fourth embodiment, but processing of the event detection unit 103 differs. The event detection unit 103 according to the present embodiment detects input of a query image for a given person as an event. In the present embodiment, for example when a request for privacy protection processing is received from a person appearing in a moving image, a query image for the person is inputted to an image processing apparatus, and privacy protection processing is performed in accordance with the event detection unit 103 detecting input of the query image. In addition, the image processing system in the present embodiment is assumed to be a part of a video recording system (not shown) for performing management of recorded video data.

<Processing>

Next, with reference to FIG. 12A through FIG. 12C and FIG. 13A through FIG. 13D, description is given for a procedure for processing performed by the image processing system (video recording system) and the image processing apparatus according to the present embodiment.

<Video Recording Sequence>

Figure 12A:
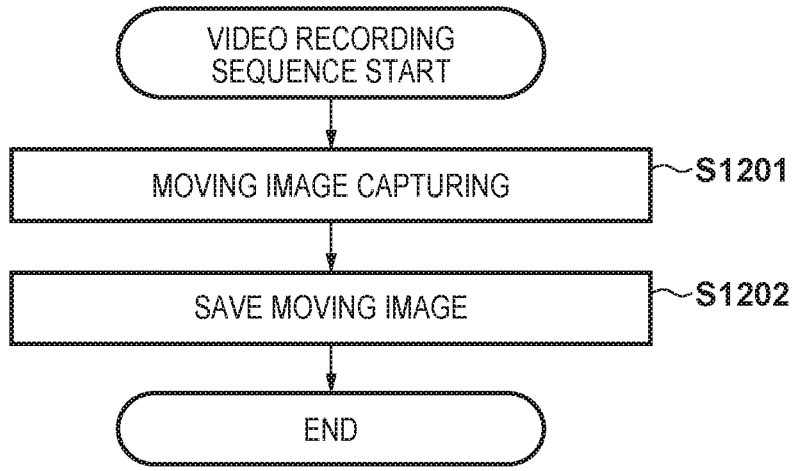

Firstly, FIG. 12A is an example of a video recording sequence according to the present embodiment. Because the respective processing of step S1201 and step S1202 is similar to the respective processing of step S701 and step S702 described with reference to FIG. 7A in the second embodiment, description thereof is omitted.

<UI Sequence>

Figure 12B:
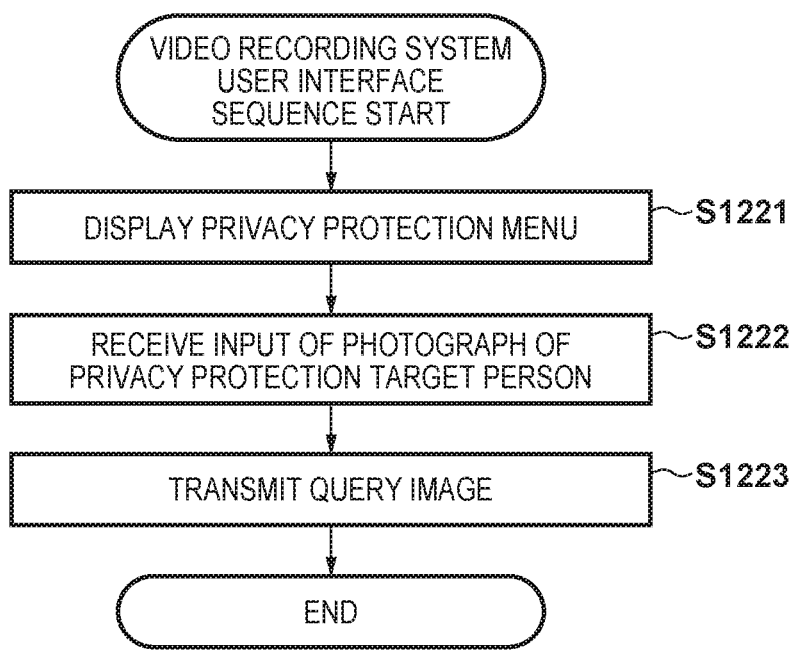
Figure 13C:
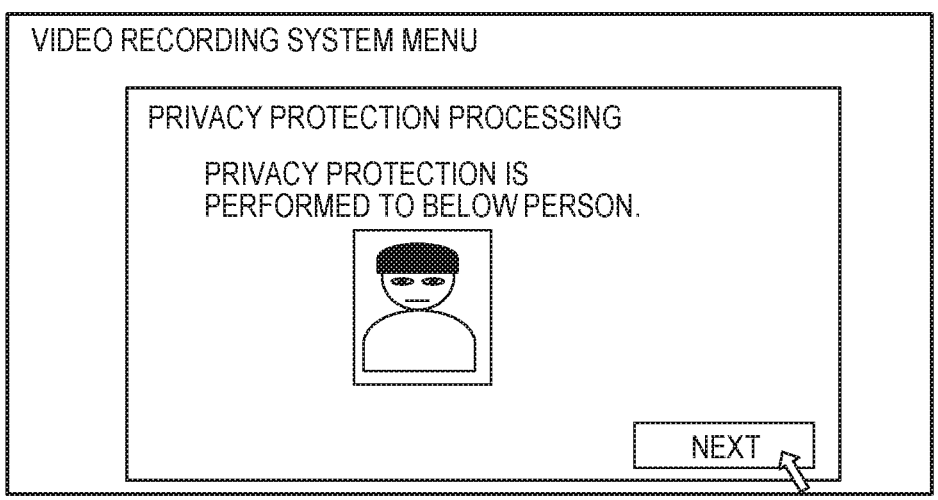

FIG. 12B is an example of a video recording system UI sequence. In addition, FIG. 13A through FIG. 13D are examples of UIs in a video recording system. In step S1221, the video recording system displays a privacy protection menu. For example, a privacy protection processing menu as illustrated in FIG. 13A is displayed.

In step S1222, the video recording system accepts a photograph of a privacy protection target person. For example, a privacy protection processing window as illustrated in FIG. 13B is displayed, and an input of a photograph of a privacy protection target person is accepted.

Figure 13D:
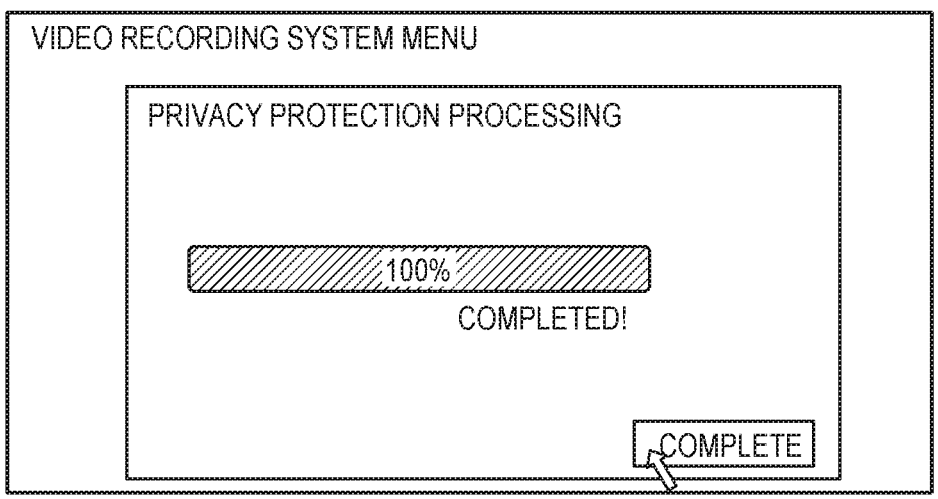

In step S1223, the video recording system transmits the inputted query image for the privacy protection target person to the image processing system. For example, transmission is executed when a user clicks on "next" in a screen as illustrated in FIG. 13C. Subsequently, a screen indicating that transmission has completed as illustrated in FIG. 13D is displayed. The above is the flow for the series of processing for FIG. 12B.

<Privacy Protection Sequence>

FIG. 12C is an example of a privacy protection sequence according to the present embodiment, but in particular processing for step S1241 differs.

In step S1241, the event detection unit 103 detects that a query image for a privacy protection target person has been inputted. The processing of step S1242 is similar to the processing of step S1123, but the feature amount of the privacy protection target person is extracted using the query image in which the person appears.

Because respective processing of the subsequent step S1243 through step S1247 is similar to the respective processing of step S1124 through step S1128 of FIG. 11B, description thereof is omitted. The above is the flow for the series of processing for FIG. 12C.

As described above, in the present embodiment, when a request for privacy protection processing is received from a person appearing in a moving image, an image in which the person appears is obtained as a query image. A feature amount is extracted from that image, and privacy protection processing is performed for the person in moving images captured in the past. Accordingly, it is possible to reduce a cost of a monitoring-moving-image administrator managing personal information that is in a moving image. Accordingly, it is possible to realize privacy protection that is more flexible and highly convenient.

[Variations]

In the embodiments described above, configuration may be taken such that privacy protection processing is performed only for an image of an area that can be entered for which there is an entrance authorization. For example, in the third embodiment, description was given for an example in which, when an event where privacy protection processing should be performed for a specific person occurs, the person is searched for in recorded moving images, and privacy protection processing is performed. In contrast, configuration may be taken to cooperate with an entrance management system, and in an area where the camera is installed, determine whether a person corresponding to a person ID who appears in the camera has entrance authorization for the installation area, and perform privacy protection processing only when the person has entrance authorization. Consequently, it is possible to keep, as a suspicious activity, an image captured in an area where there is no entrance authorization.

In addition, in the fourth embodiment, description was given on an example of, upon detecting a person leaving a specific region, performing privacy protection processing for the corresponding person, but configuration may be taken such that privacy protection processing is not performed for a person registered on a black list that lists persons for which attention is needed. For example, after performing the processing of step S1123 of FIG. 11B, a comparison is made between face feature amounts of a person leaving and feature amounts of a person registered in the black list. When the person leaving is determined to be a person registered in the black list, the privacy protection sequence ends. Consequently, it is possible to easily discover and monitor a person needing attention who does not need privacy protection processing, while performing privacy protection processing for an appropriate person.

By virtue of the present invention, it is possible to realize privacy protection that is more flexible and highly convenient.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-054873, filed Mar. 21, 2017 and Japanese Patent Application No. 2017-238918, filed Dec. 13, 2017, which are hereby incorporated by reference wherein in their entirety.

What is claimed is:

1. An image processing apparatus, comprising:
a first obtaining unit configured to obtain an image captured by an image capturing apparatus;
a recognition unit configured to recognize a person from the image obtained by the first obtaining unit;
a second obtaining unit configured to obtain information indicating a contract expiration time of an employee from a management system which holds information indicating the contract expiration time of the employee; and
an image processing unit configured to execute image processing for obscuring the employee in the image in accordance with result of recognition by the recognition unit if a time limit for the employee has passed, wherein the time limit is based on the contract expiration time corresponding to the employee.

2. The image processing apparatus according to claim 1, further comprising a saving unit configured to save the image obtained by the first obtaining unit,
wherein the image processing unit executes the image processing for obscuring the employee in the image, that includes the employee, out of the images saved in the saving unit.

3. The image processing apparatus according to claim 1, wherein the image processing for obscuring the employee in the image is mask processing on the employee in the image.

4. The image processing apparatus according to claim 1, wherein the image processing unit executes the image processing for obscuring the employee in an image of an area if the employee has entrance authorization for the area.

5. An image processing method comprising:
obtaining an image captured by an image capturing apparatus;
recognizing a person from the image;
obtaining information indicating a contract expiration time of an employee from a management system which holds information indicating the contract expiration time of the employee; and
executing image processing for obscuring the employee in the image in accordance with result of recognition in the recognizing if a time limit for the employee has passed, wherein the time limit is based on the contract expiration time corresponding to the employee.

6. A non-transitory computer-readable storage medium storing a computer program for causing a computer to execute an image processing method, the image processing method comprising:
obtaining an image captured by an image capturing apparatus;
recognizing a person from the image;
obtaining information indicating a contract expiration time of an employee from a management system which holds information indicating the contract expiration time of the employee; and
executing image processing for obscuring the employee in the image in accordance with result of recognition in the recognizing if a time limit for the employee has passed, wherein the time limit is based on the contract expiration time corresponding to the employee.

7. The image processing apparatus according to claim 1, further comprising a setting unit configured to set the time limit for the employee based on the contract expiration time corresponding to the employee.

8. The image processing apparatus according to claim 1, wherein the recognition unit recognizes the employee from the image obtained by the first obtaining unit,
wherein the second obtaining unit obtains, from the management system, information indicating the contract expiration time of the employee recognized by the recognition unit, and
wherein the image processing unit executes the image processing for obscuring the employee in the image recognized by the recognition unit if the time limit for the employee recognized by the recognition unit has passed, the time limit being based on the contract expiration time corresponding to the employee.

* * * * *